United States Patent
Bengtsson

(10) Patent No.: US 10,965,337 B2
(45) Date of Patent: Mar. 30, 2021

(54) ANTENNA CONFIGURATION SWITCHING FOR FULL-DUPLEX TRANSMISSION

(71) Applicant: Sony Mobile Communications Inc., Tokyo (JP)

(72) Inventor: Erik Bengtsson, Eslöv (SE)

(73) Assignee: SONY MOBILE COMMUNICATIONS INC., Tokyo (JP)

(*) Notice: Subject to any disclaimer, the term of this patent is extended or adjusted under 35 U.S.C. 154(b) by 13 days.

(21) Appl. No.: 16/338,293

(22) PCT Filed: Sep. 30, 2016

(86) PCT No.: PCT/EP2016/073448
§ 371 (c)(1),
(2) Date: Mar. 29, 2019

(87) PCT Pub. No.: WO2018/059708
PCT Pub. Date: Apr. 5, 2018

(65) Prior Publication Data
US 2019/0238174 A1    Aug. 1, 2019

(51) Int. Cl.
*H04B 1/44* (2006.01)
*H04L 5/14* (2006.01)
(Continued)

(52) U.S. Cl.
CPC .............. *H04B 1/44* (2013.01); *H04B 1/56* (2013.01); *H04B 7/0413* (2013.01);
(Continued)

(58) Field of Classification Search
CPC ........ H04B 1/005; H04B 1/1024; H04B 1/18; H04B 1/44; H04B 1/45; H04B 1/401;
(Continued)

(56) References Cited

U.S. PATENT DOCUMENTS

2009/0207093 A1* 8/2009 Anreddy ................. H04B 7/10
343/876
2015/0071062 A1 3/2015 Cheng
(Continued)

FOREIGN PATENT DOCUMENTS

WO    2015096027    7/2015

OTHER PUBLICATIONS

Jiao et al., "Spatial Modulated Full Duplex", IEEE Wireless Communications Letters, vol. 3, No. 6, Dec. 1, 2014.
Zhou et al., "Transmit-Receive Antenna Pair Selection in Full Duplex Systems", IEEE Wireless Communications Letters, vol. 3, No. 1, Feb. 1, 2014.
PCT International Search Report, dated Jun. 21, 2017, for corresponding PCT International Application No. PCT/EP2016/073448.
(Continued)

*Primary Examiner* — Kevin C. Harper
(74) *Attorney, Agent, or Firm* — Myers Bigel, P.A.

(57) ABSTRACT

A radio device transmits outgoing radio signals on a carrier frequency to a further radio device and receives incoming radio signals on the same carrier frequency from the further radio device. The radio device switches at least between a first antenna configuration and a second antenna configuration, e.g., by using a switch. In the first antenna configuration, the outgoing radio signals are transmitted via at least one first antenna while simultaneously the incoming radio signals are received via at least one second antenna. In the second antenna configuration, the outgoing radio signals are transmitted via the at least one second antenna while simultaneously the incoming radio signals are received via the at least one first antenna.

13 Claims, 5 Drawing Sheets

(51) Int. Cl.
  *H04L 5/18* (2006.01)
  *H04B 1/56* (2006.01)
  *H04B 7/0413* (2017.01)
  *H04B 7/06* (2006.01)
  *H04B 7/08* (2006.01)

(52) U.S. Cl.
  CPC ......... *H04B 7/0602* (2013.01); *H04B 7/0802* (2013.01); *H04L 5/14* (2013.01); *H04L 5/1461* (2013.01); *H04L 5/18* (2013.01)

(58) Field of Classification Search
  CPC .......... H04B 7/04; H04B 7/06; H04B 7/0602; H04B 7/0604; H04B 7/08; H04B 7/0802; H04B 7/0805; H04L 5/14; H04L 5/1423; H04L 5/1461
  See application file for complete search history.

(56) References Cited

U.S. PATENT DOCUMENTS

2015/0098444 A1* 4/2015 Marzetta ........... H04W 36/0072
  370/331
2016/0380745 A1* 12/2016 Wu ......................... H04B 1/40
  370/277

OTHER PUBLICATIONS

PCT Written Opinion of the International Searching Authority, dated Jun. 21, 2017, for corresponding PCT International Application No. PCT/EP2016/073448.

* cited by examiner

ANTENNA CONFIGURATION SWITCHING FOR FULL-DUPLEX TRANSMISSION

CROSS REFERENCE TO RELATED APPLICATIONS

This application is a 35 U.S.C. § 371 national stage application of PCT International Application No. PCT/EP2016/073448, filed on Sep. 30, 2016, the contents of which are incorporated herein by reference in its entirety. The above-referenced PCT International Application was published in the English language as International Publication No. WO 2018/059708 A1 on Apr. 5, 2018.

FIELD OF THE INVENTION

The present invention relates to methods of controlling radio transmission and to corresponding devices.

BACKGROUND OF THE INVENTION

In wireless communication systems, it is known to utilize full-duplex operation or half-duplex operation. In the case of full-duplex operation, a radio device can transmit and receive at the same time, while in the case of half-duplex operation, the radio device may only either transmit or receive at a given time. Full-duplex operation modes are for example defined for the LTE radio technology specified by 3GPP. In the case of the full-duplex operation specified for the LTE radio technology, transmit radio signals and receive radio signals are separated in the frequency domain, i.e., different carrier frequencies are used for the transmit radio signals and the receive radio signals.

To further enhance capacity or performance, it was also suggested to use full-duplex operation on the same carrier frequency. Corresponding research is for example described in "Full-duplex Radios" by D. Bharadia et al., Proceedings of the ACM SIGCOMM 2013 conference on SIGCOMM (2013). In the case of full-duplex operation, a radio module typically has a transmitting branch for processing outgoing radio signals and a receiving branch for processing incoming radio signals. Cross-talk cancellation techniques are typically applied for cancelling the outgoing radio signals from the incoming radio signals.

In the case of full-duplex operation, one challenge is to achieve sufficient isolation between the transmitting branch and the receiving branch, in particular between an output power amplifier (PA) of the transmitting branch and an input LNA (low noise amplifier) of the receiving branch. One approach to address this challenge is to use separate antennas for the outgoing radio signals and the incoming radio signals. However, this may have adversely affect channel reciprocity for the incoming radio signals and the outgoing radio signals, i.e., radio channel characteristics for the incoming signals may not be considered as equivalent to radio channel characteristics for the outgoing signals. Accordingly, problems may arise if channel reciprocity needs to be assumed for channel estimation purposes, like for example in some MIMO (Multiple Input Multiple Output) technologies.

Accordingly, there is a need for techniques that allow for efficiently utilizing full-duplex radio transmission on the same carrier frequency.

SUMMARY OF THE INVENTION

According to an embodiment of the invention, a method of controlling full-duplex radio transmission is provided. According to the method, a radio device transmits outgoing radio signals on a carrier frequency to a further radio device and receives incoming radio signals on the carrier frequency from the further radio device. Accordingly, transmitting of the outgoing radio signals and receiving of the incoming radio signals occurs on the same carrier frequency. The radio device switches at least between a first antenna configuration and a second antenna configuration. In the first antenna configuration, the outgoing radio signals are transmitted via at least one first antenna while simultaneously the incoming radio signals are received via at least one second antenna. In the second antenna configuration, the outgoing radio signals are transmitted via the at least one second antenna while simultaneously the incoming radio signals are received via the at least one first antenna. By switching between the antenna configurations, the at least one first antenna and the at least one second antenna are thus alternately used for the incoming radio signals and the outgoing radio signals. This may allow for utilizing channel reciprocity considerations when performing channel estimation, e.g., for the purpose of controlling multi-antenna transmission configurations. At the same time, the at least one first antenna and the at least one second antenna may be utilized for efficiently achieving sufficient isolation between a transmit branch and a receive branch of the radio device.

The radio device may correspond to a wireless communication device, e.g., a UE. In this case, the further radio device may correspond to the base station of a wireless communication network. The outgoing radio signals could then also be referred to as uplink (UL) radio signals, while the incoming radio signals could be referred to as the downlink (DL) radio signals. In other scenarios, the further radio device could correspond to a wireless communication device as well, e.g., to a further UE. For example, the outgoing radio signals and the incoming radio signals could correspond to device-to-device (D2D) communication signals. In some scenarios, the radio device may also correspond to a base station of a wireless communication network, while the further radio device may correspond to a wireless communication device, e.g., to a UE. The outgoing radio signals could then correspond to DL radio signals, while the incoming radio signals could correspond to UL radio signals.

According to an embodiment, the outgoing radio signals comprise a first reference signal transmitted in the first antenna configuration and a second reference signal transmitted in the second antenna configuration. Accordingly, a reference signal may be transmitted in each of the antenna configurations, which allows for accurate channel estimation in each of the antenna configurations.

According to an embodiment, the radio device estimates first radio channel characteristics on the basis of the incoming radio signals received in the first antenna configuration and second radio channel characteristics on the basis of the incoming radio signals received in the second antenna configuration.

The above-mentioned first radio channel characteristics and second radio channel characteristics may then be applied for controlling transmission of the outgoing radio signals and/or reception of the incoming radio signals. Specifically, in the first antenna configuration, the radio device may control transmission of the outgoing radio signals on the basis of the second radio channel characteristics and/or control reception of the incoming radio signals on the basis of the second radio channel characteristics. In the second antenna configuration, the radio device may control transmission of the outgoing radio signals on the basis of the first radio channel characteristics and/or control reception of the incoming radio signals on the basis of the first radio channel characteristics. In this way, the assumption of channel reciprocity may be applied separately for each of the antenna configurations.

According to an embodiment, the incoming radio signals received in the first antenna configuration comprise a first received reference signal, and the radio device estimates the first radio channel characteristics on the basis of the first received reference signal. Similarly, the incoming radio signals received in the second antenna configuration may comprise a second received reference signal, and the radio device may estimate the second radio channel characteristics on the basis of the second received reference signal. Accordingly, in both antenna configurations the radio device may utilize reference signals for precisely estimating the radio channel characteristics.

The above mentioned controlling of transmission of the outgoing radio signals and/or controlling of reception of the incoming radio signals may for example involve controlling of a multi-antenna transmission configuration. Here, the possibility of being able to assume channel reciprocity may allow for quick control processes, as for example needed in a multi-user MIMO system. However, it is noted that the estimated channel characteristics may be useful for other control processes as well.

According to an embodiment, the radio device may also switch to a third antenna configuration. In this third antenna configuration further outgoing radio signals may be transmitted via the at least one first antenna and the at least one second antenna to the further radio device. Similarly, the radio device may also switch to a fourth antenna configuration, in which further incoming radio signals are received via the at least one first antenna and the at least one second antenna from the further radio device.

In the third antenna configuration or in the fourth antenna configuration the at least one first antenna and the at least one second antenna are thus utilized for the same transmission direction, e.g., in half-duplex operation. This may be useful in scenarios where there is an imbalance with respect to the amount of data to be conveyed by the incoming radio signals and the outgoing radio signals. For example, in some scenarios there may be more DL traffic to a wireless communication device then UL traffic from the wireless communication device.

According to an embodiment, the radio device coordinates the switching between the antenna configurations with switching of antenna configurations by the further radio device, e.g., on the basis of synchronization signals transmitted between the radio device and the further radio device. This may be useful in scenarios where also the further radio device utilizes separate antennas for the incoming radio signals and the outgoing radio signals, e.g., to achieve sufficient isolation between its transmit branch and receive branch.

According to a further embodiment, a radio device is provided. The radio device comprises a transmit branch for processing outgoing radio signals transmitted on a carrier frequency to a further radio device and a receive branch for processing incoming radio signals received on the carrier frequency from the further radio device. Further, the radio device comprises at least one first antenna and at least one second antenna. Further, the radio device comprises a switch coupled between, on the one hand, the transmit branch and the receive branch and, on the other hand, the at least one first antenna and the at least one second antenna. The switch is configured to switch at least between a first antenna configuration and a second antenna configuration. In the first antenna configuration the outgoing radio signals are transmitted via at least one first antenna while simultaneously the incoming radio signals are received via at least one second antenna. In the second antenna configuration the outgoing radio signals are transmitted via the at least one second antenna while simultaneously the incoming radio signals are received via the at least one first antenna. By the switch, the at least one first antenna and the at least one second antenna are thus alternately used for the incoming radio signals and the outgoing radio signals. This may allow for utilizing channel reciprocity considerations when performing channel estimation, e.g., for the purpose of controlling multi-antenna transmission configurations. At the same time, the at least one first antenna and the at least one second antenna may be utilized for efficiently achieving sufficient isolation between the transmit branch and the receive branch of the radio device.

According to a further embodiment, the radio device further comprises one or more processors configured to control the switch. In particular, the one or more processors may be configured to control the radio device to perform the steps of the above-method method.

As already mentioned above, the radio device may correspond to a wireless communication device, e.g., a UE. In this case, the further radio device may correspond to the base station of a wireless communication network. In other scenarios, the further radio device could correspond to a wireless communication device as well, e.g., to a further UE. In some scenarios, the radio device may also correspond to a base station of a wireless communication network, while the further radio device may correspond to a wireless communication device, e.g., to a UE.

According to an embodiment, the outgoing radio signals comprise a first reference signal transmitted in the first antenna configuration and a second reference signal transmitted in the second antenna configuration. Accordingly, a reference signal may be transmitted in each of the antenna configurations.

According to an embodiment, the one or more processors may be configured to estimate first radio channel characteristics on the basis of the incoming radio signals received in the first antenna configuration and second radio channel characteristics on the basis of the incoming radio signals received in the second antenna configuration.

The above-mentioned first radio channel characteristics and second radio channel characteristics may be applied for controlling transmission of the outgoing radio signals and/or reception of the incoming radio signals. Specifically, in the first antenna configuration, the one or more processors may be configured to control transmission of the outgoing radio signals on the basis of the second radio channel characteristics and/or control reception of the incoming radio signals on the basis of the second radio channel characteristics. In the second antenna configuration the one or more processors may be configured to control transmission of the outgoing radio signals on the basis of the first radio channel characteristics and/or control reception of the incoming radio signals on the basis of the first radio channel characteristics.

According to an embodiment, the incoming radio signals received in the first antenna configuration comprise a first received reference signal, and the one or more processors may be configured to estimate the first radio channel characteristics on the basis of the first received reference signal. Similarly, the incoming radio signals received in the second antenna configuration may comprise a second received reference signal, and the one or more processors may be configured to estimate the second radio channel characteristics on the basis of the second received reference signal. Accordingly, in both antenna configurations the reference signals may be utilized for precisely estimating the radio channel characteristics. The controlling of transmission of the outgoing radio signals and/or controlling of reception of the incoming radio signals by the one or more processors may for example involve controlling of a multi-antenna transmission configuration.

According to an embodiment, the switch may also be configured to switch to a third antenna configuration. In this third antenna configuration further outgoing radio signals may be transmitted via the at least one first antenna and the at least one second antenna to the further radio device. Similarly, the switch may also be configured to switch to a fourth antenna configuration, in which further incoming radio signals are received via the at least one first antenna and the at least one second antenna from the further radio device.

According to an embodiment, the one or more processors may also be configured to coordinate the switching between the antenna configurations with switching of antenna configurations by the further radio device, e.g., on the basis of synchronization signals transmitted between the radio device and the further radio device.

According to a further embodiment, a system is provided. The system comprises a first radio device and a second radio device which are configured to transmit, on the same carrier frequency, first radio signals from the first radio device to the second radio device and second radio signals from the second radio device to the first radio device. The first radio device and the second radio device are each configured to switch at least between a first antenna configuration and a second antenna configuration. In the first antenna configuration the first radio signals are transmitted from at least one first antenna of the first radio device to at least one first antenna of the second radio device while simultaneously the second radio signals are transmitted from at least one second antenna of the second radio device to at least one second antenna of the first radio device. In the second antenna configuration the first radio signals are transmitted from the at least one second antenna of the first radio device to the at least one second antenna of the second radio device while simultaneously the second radio signals are transmitted from the at least one first antenna of the second radio device to the at least one first antenna of the first radio device.

Accordingly, in the above system each of the first radio device and the second radio device may be configured to operate in a coordinated manner according to the above method. The coordination may for example be achieved on the basis of synchronization signals transmitted between the first radio device and the second radio device. From the perspective of the first radio device, the first radio signals correspond to the outgoing radio signals and the second radio signals correspond to the incoming radio signals. From the perspective of the second radio device, second radio signals correspond to the outgoing radio signals and the first radio signals correspond to the incoming radio signals.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to controlling radio transmission in a wireless communication system, specifically with respect to utilization of full-duplex radio transmissions on the same carrier frequency. In the illustrated examples, it is assumed that the radio transmissions are based on the LTE radio technology. However, it is to be understood that also other wireless communication technologies could be used in as an alternative or in addition, e.g., other cellular radio technologies, such as an NR (New Radio) technology as currently developed by 3GPP, or a WLAN (Wireless Local Area Network) technology.

Figure 1:
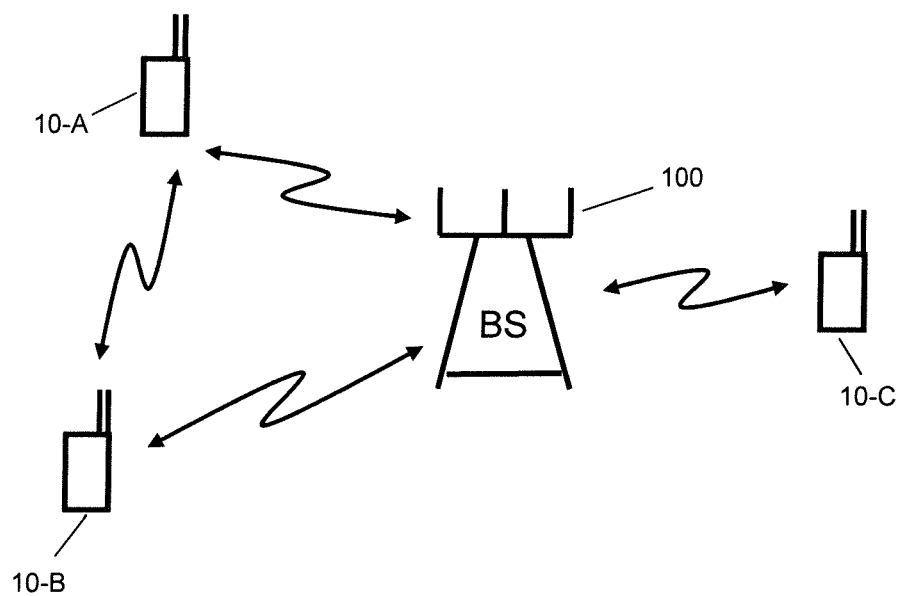
FIG. 1 schematically illustrates a mobile communication system in which full-duplex radio transmission according to an embodiment of the invention may be utilized.

FIG. 1 schematically illustrates a wireless communication system. More specifically, FIG. 1 shows infrastructure of a mobile communication network in the form of a base station 100. Further, the one shows a group of UEs 10-A, 10-B, 10-C which are connected via the base station 100 to the mobile communication network. Accordingly, the base station 100 may provide data and control access of the UEs 10-A, 10-B, 10-C to the mobile communication network. For example, the UEs 10-A, 10-B, 10-C may be connected to one or more cells served by the base station 100. Further, the wireless communication system may also support device-two-device (D2D) communication. By way of example, FIG. 1 illustrates D2D communication between the UEs 10-A and 10-B.

In the examples as further illustrated below, it is assumed that full-duplex operation on the same carrier frequency may be utilized for radio communication in the wireless communication system. Accordingly, a radio device, such as the base station 100 or one of the UEs 10-A, 10-B, or 10-C may simultaneously transmit and receive on the same carrier frequency. For example, the full-duplex operation could be utilized for radio communication of the UE 10-A with the base station 100, for radio communication of the UE 10-B with the base station 100, or for radio communication of the UE 10-C with the base station 100. Further, the full-duplex operation could be utilized for D2D radio communication of the UE 10-A with the UE 10-B.

Figure 2:
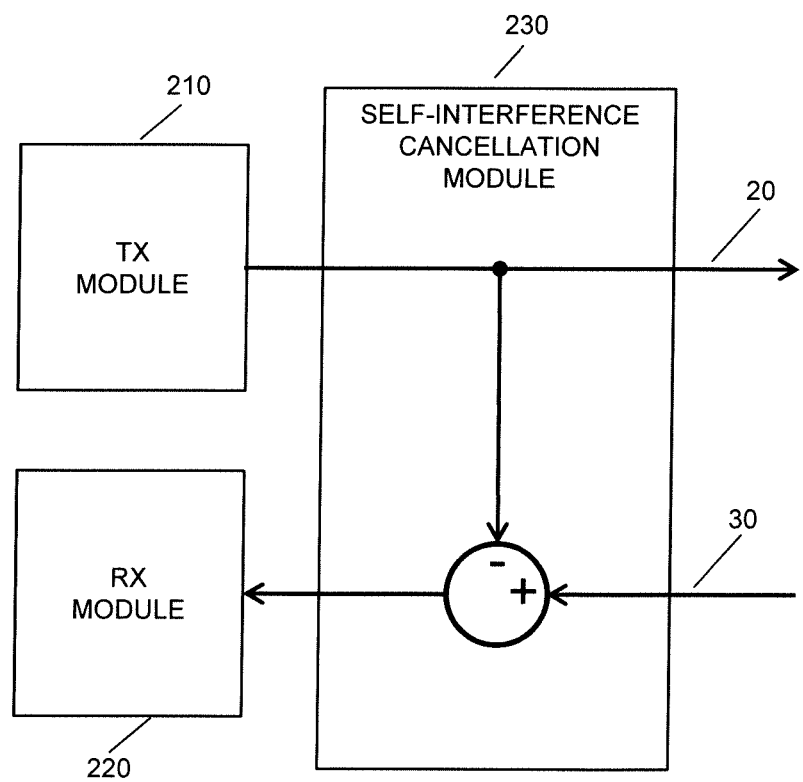
FIG. 2 schematically illustrates radio functionalities for implementing full-duplex operation according to embodiments of the invention.

FIG. 2 shows a block diagram for schematically illustrating radio functionalities which may be utilized for implementing the full-duplex operation on the same carrier frequency. Functionalities as illustrated in FIG. 2 may be implemented in each radio device involved in radio communication with full-duplex operation, e.g., in each of the UEs 10-A, 10-B, 10-C or in the base station 100.

The functionalities illustrated in FIG. 2 include a transmit (TX) module 210, a receive (RX) module 220, and a self-interference cancellation module 230. The TX module 210 is responsible for generating a first signal 20 which is transmitted to another radio device. The RX module 220 is responsible for receiving a second signal 30 from the other radio device. The first and second signals 20, 30 transmitted simultaneously and on the same carrier frequency. In this way, a highly efficient usage of radio resources is possible. Further, utilization of the full-duplex operation may offer low latency because the radio device may transmit and receive at the same time.

To avoid adverse effects arising from the simultaneous utilization of the same carrier frequency for both signals 20, 30, the self-interference cancellation module 230 is provided. As illustrated, the self-interference cancellation module 230 may operate by subtracting the first signal 20 from the second signal 30. In this way, impact of the first signal 20 as transmitted by the TX module 210 on the second signal 30 as received by the RX module 220 can be reduced or even completely eliminated.

It is to be understood that the elements of FIG. 2 have been shown for illustrating basic principles of how the full-duplex operation may be implemented, and that in practical implementations further functionalities or modified functionalities may be provided. For example, various algorithms of self-interference cancellation could be applied. Further, the self-interference cancellation could be applied in the digital domain, using digital signal processing, in the analog domain, using analog signal processing, or both in the digital domain and the analogue domain. Moreover, it is to be understood that the full-duplex operation on the same carrier frequency may be combined with various other multiplexing technologies, e.g., frequency division multiplexing, time division multiplexing, code division multiplexing, and/or spatial multiplexing. For example, when using frequency division multiplexing, the full-duplex operation could be applied for each of multiple carrier frequencies. Similarly, in the case of time division multiplexing, the full-duplex operation could be applied in each time slot assigned. Further, in the case of code division multiplexing, the full-duplex operation may be applied with respect to each of multiple codes. Further, in the case of spatial multiplexing, the full-duplex operation may be applied with respect to each of multiple spatial channels. Accordingly, the first signal 20 and the second signal 30 may be transmitted on the same carrier frequency, in the same time slot, using the same code, and on the same spatial channel.

Figure 3A:
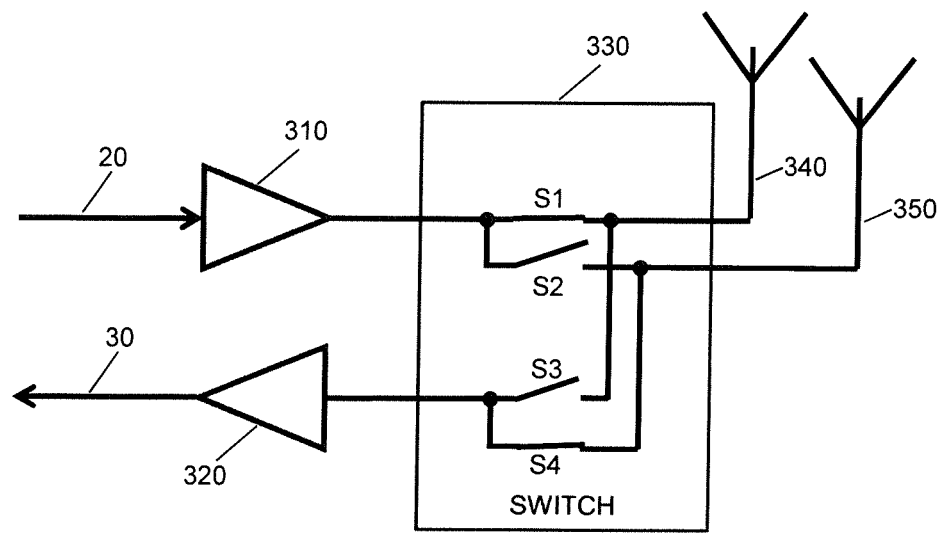
FIGS. 3A and 3B schematically illustrate circuitry for switching between different antenna configurations when performing full-duplex radio transmissions according to an embodiment of the invention.
Figure 3B:
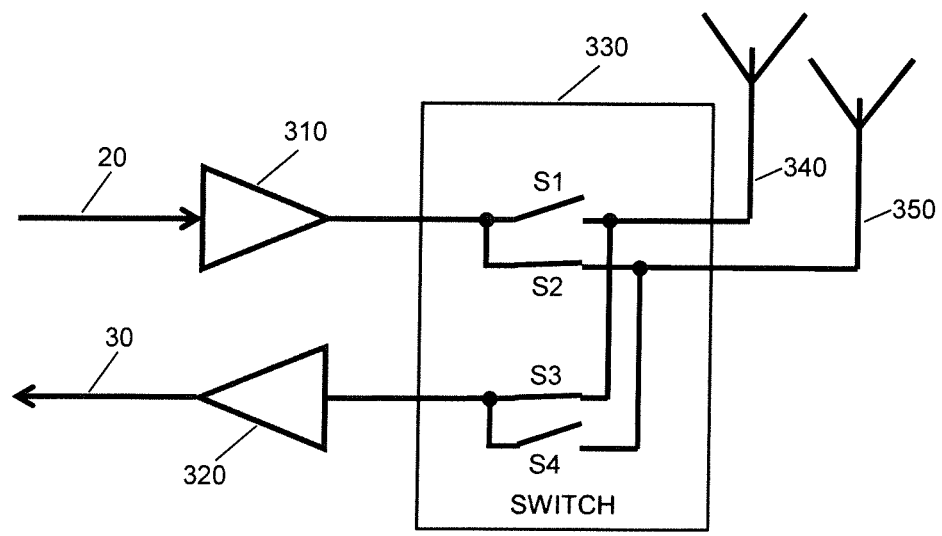

FIGS. 3A and 3B further illustrate how the first signal 20 is transmitted from the radio device and the second signal 30 is received in the radio device.

As illustrated in FIGS. 3A and 3B, separate antennas 340, 350 are used for achieving sufficient isolation between a transmit branch provided for processing of the first signal 20 and a receive branch provided for processing of the second signal 30. In the illustrated example, the transmit branch would include the TX module 210 and the receive brand would include the RX module 220. As further illustrated in FIGS. 3A and 3B, the transmit branch may include an output amplifier 310 and the receive branch may include an input amplifier 320. In typical implementations, the output amplifier 310 would be a PA, while the input amplifier 320 would be an LNA. Accordingly, the signal power at the output of the output amplifier 310 may be significantly higher than a power level which is compatible with the sensitivity of the input amplifier 320. In the illustrated example, this situation is efficiently addressed by using the separate antennas 340 and 350 for transmitting the first signals 20 and receiving the second signals 30. Specifically, the use of the separate antennas 340, 350 may avoid utilizing additional analog circuitry for isolating the input of the input amplifier 320 from the output of the output amplifier 310. This allows for achieving better high signal quality and/or low component costs.

As further shown in FIGS. 3A and 3B, a switch 330 is provided for coupling the antennas 340, 350 to the transmit branch and the receive branch. In the example of FIGS. 3A and 3B, the switch 330 is implemented as a DPDT (dual pole dual throw) switch, also referred to as cross switch, and includes switch elements S1, S2, S3, and S4. The switch elements may for example be implemented using transistor technology, e.g., by MOS (Metal Oxide Semiconductor) field effect transistors.

The switch 330 allows for switching between a first antenna configuration, as illustrated in FIG. 3A, and a second antenna configuration, as illustrated in FIG. 3B. In the first antenna configuration the antenna 340 is connected to the transmit branch and thus utilized for transmitting the first signal 20, while the antenna 350 is connected to the receive branch and thus utilized for receiving the second signal 30. This is achieved by closing the switch element S1 to connect the antenna 340 to the transmit branch, opening the switch element S2 to disconnect the antenna 340 from the receive branch, closing the switch element S3 to connect the antenna 350 to the receive branch, and opening the switch element S4 to disconnect the antenna 350 from the transmit branch. In the second antenna configuration the antenna 350 is connected to the transmit branch and thus utilized for transmitting the first signal 20, while the antenna 340 is connected to the receive branch and thus utilized for receiving the second signal 30. This is achieved by opening the switch element S1 to disconnect the antenna 340 from the transmit branch, closing the switch element S2 to connect the antenna 340 to the receive branch, opening the switch element S3 to disconnect the antenna 350 from the receive branch, and closing the switch element S4 to connect the antenna 350 to the transmit branch.

It is noted that in some scenarios also more complex switches may be utilized which for example could allow switching to an antenna configuration in which the antenna 340 and the antenna 350 are at the same time connected to different transmit branches or an antenna configuration in which the antenna 340 and the antenna 350 are at the same time connected to different receive branches. This may for example be done the purpose of using the antennas 340 and 350 for beamforming or spatial multiplexing.

Further, it is noted that in some scenarios multiple instances of the components as illustrated in FIGS. 2, 3A, and 3B may need to be provided in the same radio device. For example, when utilizing a MIMO (Multiple Input Multiple Output) technology for spatial multiplexing, the components as illustrated in FIGS. 2, 3A, and 3B may be provided for each spatial channel. Further, it is noted that in some scenarios the structures and components may be provided in an asymmetric manner in the two radio devices performing the full-duplex radio transmissions. For example, the wireless communication network could use a multi-user MIMO technology or massive MIMO technology, and the base station 100 could need to support multiple separate spatial channels for each of the UEs 10-A, 10-B, 10-C, while each of the UEs 10-A, 10-B, 10-C merely needs to support basic beamforming functionalities. In this case, the base station 100 may need a significantly higher number of separate transmit and receive branches than each individual UE 10-A, 10-B, 10-C, and the number of the components as illustrated in FIGS. 2, 3A, and 3B would need to be increased accordingly.

Figure 4:
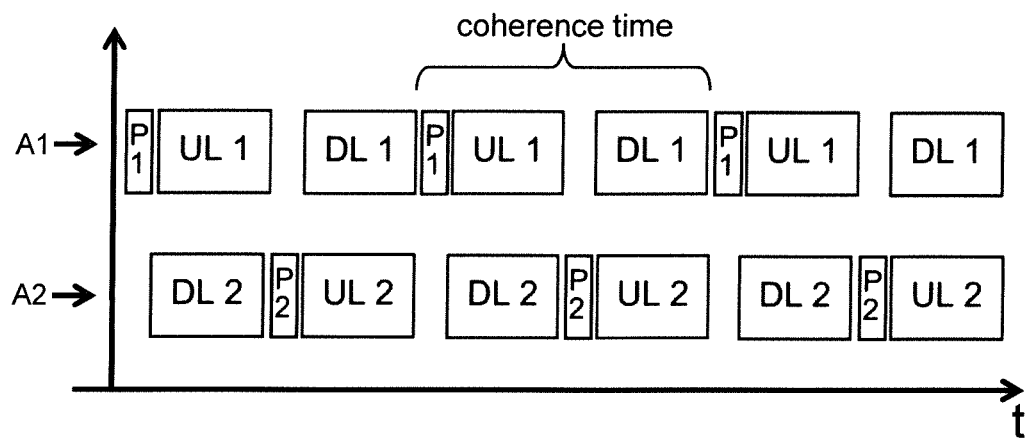
FIG. 4 illustrates an antenna configuration switching scheme according to an embodiment of the invention.

FIG. 4 further illustrates an example of how switching between the antenna configurations may be scheduled. In FIG. 4, it is assumed that the full-duplex transmissions are used between the base station 100 and one of the UEs 10-A, 10-B, 10-C, i.e., include DL transmissions from the base station 100 to the UE 10-A, 10-B, 10-C and UL transmissions from the UE 10-A, 10-B, 10-C to the base station 100. FIG. 4 shows the allocation of a first group of one or more antennas, referred to as A1, and a second group of one or more antennas, referred to as A2, to the DL transmission direction and the UL transmission direction. As can be seen, the transmissions in the DL transmission direction and the UL transmission direction occur simultaneously, but using different antenna groups A1, A2. In particular, when using the antenna group A1 for the UL transmission direction, the antenna group A2 is at the same time used for the DL transmission direction, and when using the antenna group A2 for the UL transmission direction, the antenna group A1 is at the same time used for the DL transmission direction.

As further illustrated, also reference signals may be transmitted in each of the different antenna configurations. In the example of FIG. 4, these reference signals correspond to pilot signals, designated by P1 and P2. The pilot signals are transmitted by the UE 10-A, 10-B, 10-C in the UL transmission direction and may be used by the base station for estimating radio channel characteristics between the UE 10-A, 10-B, 10-C and the base station 100. In the illustrated example, the pilot signals P1, P2 are transmitted before the beginning of the transmission in the UL direction from a certain antenna group. That is to say, for the antenna group A1, the pilot signal P1 is transmitted before each UL transmission phase UL1, and for the antenna group A2, the pilot signal P2 is transmitted before each UL transmission phase UL2. Assuming channel reciprocity, the radio channel characteristic estimated on the basis of the pilot signals may then also be applied for the subsequent transmission in the DL direction. That is to say, for the antenna group A1, the radio channel characteristic estimated on the basis of the pilot signal P1 transmitted before the UL transmission phase UL1 may also be applied for the subsequent DL transmission phase DL1. Similarly, for the antenna group A2, the radio channel characteristic estimated on the basis of the pilot signal P2 transmitted before the UL transmission phase UL2 may also be applied for the subsequent DL transmission phase DL2. In FIG. 4, this extended applicability of the estimated radio channel characteristics is illustrated by a coherence time.

As further illustrated in FIG. 4, while transmitting the pilot signals P1, P2 in the UL transmission direction, there is no simultaneous transmission in the DL transmission direction. This may facilitate estimation of the radio channel characteristics based on the pilot signals P1, P2.

It is noted that in addition or as an alternative also other signals may be used as a basis for estimating the radio channel characteristics. For example, the base station 100 could also estimate the radio channel characteristics on the basis of the signals transmitted during the UL transmission phases UL1, UL2. Further, the UE 10-A, 10-B, 10-C could estimate the radio channel characteristics on the basis of the signals transmitted during the DL transmission phases DL1, DL2. Further, the UE 10-A, 10-B, 10-C could estimate the radio channel characteristics on the basis of dedicated reference signals transmitted by the base station 100. Further, also dedicated sounding signals for supporting estimation of isolation properties between the outgoing radio signals and the incoming radio signals at the other end could be transmitted by the UE 10-A, 10-B, 10-C or by the base station 100.

Further, it is noted that in some scenarios, such as when using a multi-user MIMO technology, pilot signals of multiple UEs, e.g., the UEs 10-A, 10-B, 10-C may be multiplexed in the same time slots, e.g., by using different time/frequency resources.

Figure 5:
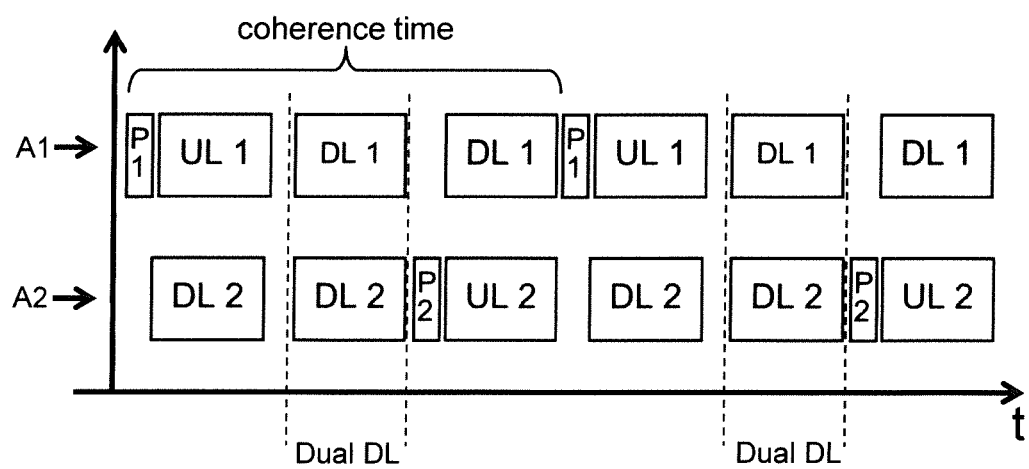
FIG. 5 illustrates an antenna configuration switching scheme according to an embodiment of the invention.

FIG. 5 further illustrates an example of how switching between the antenna configurations may be scheduled. The example of FIG. 5 is generally similar to that of FIG. 4 and uses similar designations. Also in this case, transmissions in the DL transmission direction and transmissions in the UL transmission direction occur simultaneously, but using different antenna groups A1, A2. However, in this case a further antenna configuration is provided in which both antenna groups A1, A2 are utilized simultaneously for the DL transmission direction (denoted by "dual DL"). This may allow for addressing scenarios where the UE 10-A, 10-B, 10-C has a higher demand for DL traffic than for UL traffic, which is a typical scenario in current LTE wireless communication networks. Such scheduling of DL and UL transmissions may also be referred to as mixed full-duplex and half-duplex operation.

In the example of FIG. 5, the antenna groups A1, A2 may be used for spatial multiplexing during the dual DL phases. In this case, the UE 10-A, 10-B, 10-C may be provided with two sets of receive branches, of which during the dual DL phases one uses the first antenna group A1 for receiving DL signals and the other uses the second antenna group A2 for receiving DL signals. Correspondingly, the base station 100 may be provided with two sets of transmit branches, of which during the dual DL phases one uses the first antenna group A1 for transmitting DL signals and the other uses the second antenna group A2 for transmitting DL signals.

It is noted that a similar mixed mode as in the example of FIG. 5 could also be implemented with an antenna configuration in which both antenna groups A1, A2 are utilized simultaneously for the UL transmission direction, which may be denoted as "dual UL".

Figure 6:
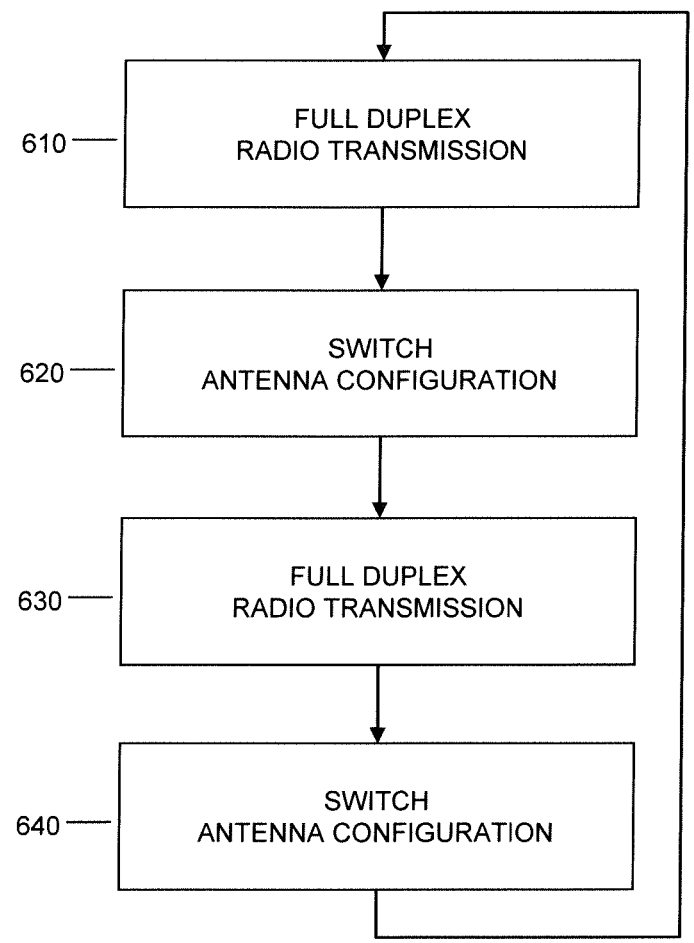
FIG. 6 shows a flowchart for illustrating a method according to an embodiment of the invention.

FIG. 6 shows a flowchart illustrating a method of controlling radio transmission, by which a radio device may implement concepts as described above. The radio device may correspond to a wireless communication device with connectivity to a wireless communication network, e.g., to one of the UEs 10-A, 10-B, 10-C. Alternatively, the radio device may also correspond to a base station of a wireless communication radio network, such as the base station 100. In some scenarios, the radio device may also correspond to a radio device supporting D2D communication, e.g., as illustrated by FIG. 1 in the case of the UEs 10-A and 10-B. If a processor based implementation of the radio device is utilized, at least a part of the steps of the method may be performed and/or controlled by one or more processors of the radio device.

At step 610, the radio device performs full-duplex radio transmissions with a further radio device. If the radio device corresponds to a wireless communication device with connectivity to a wireless communication network, e.g., to one of the UEs 10-A, 10-B, 10-C, the further radio device may correspond to a base station of the wireless communication network, such as the base station 100. Further, the radio device and the further radio device could each correspond to a wireless communication device, and the full-duplex radio transmissions could be utilized for D2D communication the radio device and the further radio device. If the radio device corresponds to a base station of a wireless communication network, the further radio device could correspond to a wireless communication device with connectivity to the wireless communication network.

The full-duplex radio transmissions involve transmission of first signals on a carrier frequency from the radio device to a further radio device. In the following, the first signals will also be referred to as outgoing radio signals. Further, the full-duplex radio transmissions involve transmission of second signals on the same carrier frequency from the further radio device to the radio device. Examples of such first and second signals are the first signal 20 and the second signal 30 as illustrated in FIG. 2. In the following, the first signals will also be referred to as outgoing radio signals and the second signals will also be referred to as incoming radio signals.

The full-duplex radio transmissions of step 610 are performed in a first antenna configuration. In the first antenna configuration the outgoing radio signals are transmitted via at least one first antenna while simultaneously the incoming radio signals are received via at least one second antenna, e.g., as illustrated in FIG. 3A.

The radio device may estimate first radio channel characteristics applicable to the first antenna configuration on the basis of the incoming radio signals received at step 610 in the first antenna configuration. The incoming radio signals received in the first antenna configuration may include a first received reference signal. The radio device may then estimate the first radio channel characteristics on the basis of the first received reference signal.

In step 610, the outgoing radio signals may comprise a first reference signal transmitted in the first antenna configuration, such as the above-mentioned pilot signal P1, which may be used by the further radio device to estimate the first radio channel characteristics.

At step 620, the radio device switches to a second antenna configuration. The switching may be performed by a switch which couples the at least one first antenna and the at least one second antenna to a transmit branch and a receive branch of the radio device. An example of such switch is illustrated in FIGS. 3A and 3B.

At step 630, the radio device performs the full-duplex radio transmissions with the further radio device in the second antenna configuration. In the second antenna configuration the outgoing radio signals are transmitted via the at least one second antenna while simultaneously the incoming radio signals are received via the at least one first antenna, e.g., as illustrated in FIG. 3B.

The radio device may estimate second radio channel characteristics applicable to the first antenna configuration on the basis of the incoming radio signals received at step 630 in the second antenna configuration. The incoming radio signals received in the second antenna configuration may include a second received reference signal. The radio device may then estimate the second radio channel characteristics on the basis of the second received reference signal.

In step 630, the outgoing radio signals may comprise a second reference signal transmitted in the second antenna configuration, such as the above-mentioned pilot signal P2, which may be used by the further radio device to estimate second radio channel characteristics.

At step 640, the radio device switches back to the first antenna configuration, e.g., by using the same switch as in step 620. The method may then be repeated by returning to step 610 to perform the full-duplex radio transmissions with the further radio device in the first antenna configuration.

At step 610, the radio device may control transmission of the outgoing radio signals on the basis of the second radio channel characteristics and/or control reception of the incoming radio signals on the basis of the second radio channel characteristics. This may involve controlling of a multi-antenna transmission configuration. The second radio channel characteristic as estimated when last performing step 630 (in a previous cycle of the method) may be used. For example, the second radio channel characteristics may be used to determine the precoding of the outgoing radio signals provided to multiple antennas, e.g., an antenna array, such that array gain, spatial separation of different users, and/or coherent combination of signals from different propagation paths is achieved. Further, the second radio channel characteristics may be used for dynamically adapting self-interference cancellation between the outgoing radio signals and the incoming radio signals, e.g., by controlling the self-interference cancellation module 230.

At step 630, the radio device may control transmission of the outgoing radio signals on the basis of the first radio channel characteristics and/or controlling reception of the incoming radio signals on the basis of the first radio channel characteristics. This may involve controlling of a multi-antenna transmission configuration. The second radio channel characteristic as estimated when last performing step 610 may be used. For example, the first radio channel characteristics may be used to determine the precoding of the outgoing radio signals provided to multiple antennas, e.g., an antenna array, such that array gain, spatial separation of different users, and/or coherent combination of signals from different propagation paths is achieved. Further, the second radio channel characteristics may be used for dynamically adapting self-interference cancellation between the outgoing radio signals and the incoming radio signals, e.g., by controlling the self-interference cancellation module 230.

In some scenarios, the radio device may also switch to a third antenna configuration in which further outgoing radio signals are transmitted via the at least one first antenna and the at least one second antenna to the further radio device. Further, the radio device may also switch to a fourth antenna configuration in which further incoming radio signals are received via the at least one first antenna and the at least one second antenna from the further radio device. The third antenna configuration or fourth antenna configuration may for example be used for implemented the dual DL phases or dual UL phases as explained in connection with FIG. 5.

The radio device may coordinate the switching between the antenna configurations with switching of antenna configurations by the further radio device, e.g., on the basis of synchronization signals transmitted between the radio device and the further radio device. This may be useful in scenarios where also the further radio device utilizes separate antennas for the incoming radio signals and the outgoing radio signals, e.g., to achieve sufficient isolation between its transmit branch and receive branch. However, it is noted that in some scenarios the incoming radio signals and the outgoing radio signals could be transmitted concurrently via the same antenna(s) of the further radio device, so that at the further radio device switching between different antenna configurations would not be needed in view of channel reciprocity considerations. For example, the further radio device could also utilize a circulator circuit or a discriminator circuit for achieving sufficient isolation between its transmit branch and receive branch.

Figure 7:
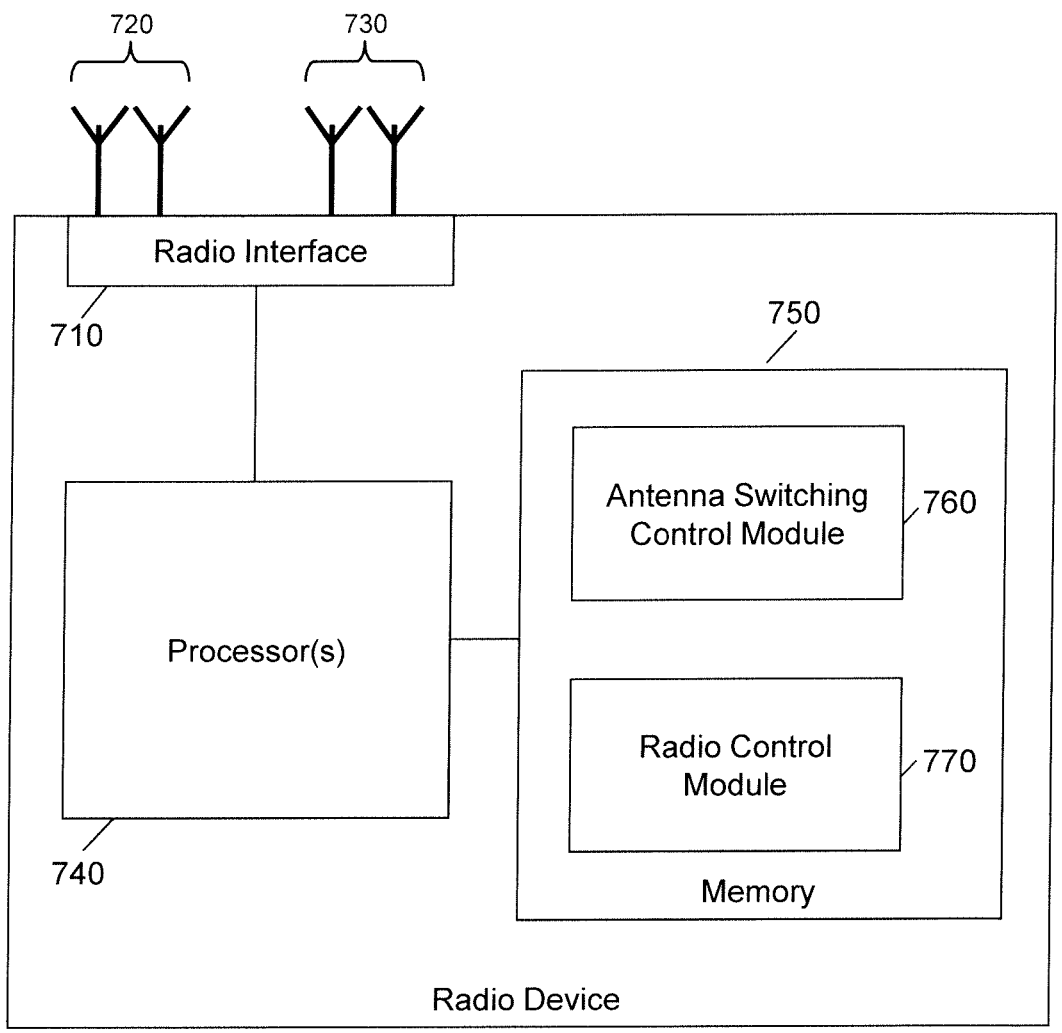
FIG. 7 schematically illustrates a processor-based implementation of a radio device according to an embodiment of the invention.

FIG. 7 shows a block diagram for schematically illustrating a processor based implementation of a radio device, which may be utilized for implementing the above concepts. The radio device may for example correspond to a base station of wireless communication network, such as the above-mentioned base station 100. Further, the radio device may correspond to a wireless communication device, such as a UE, or a wireless communication device supporting direct D2D communication.

As illustrated, the radio device includes a radio interface 710. The radio device may utilize the radio interface 710 for radio communication with a further radio device. For transmitting and receiving radio signals, the radio interface is equipped with a first group of antennas 720 and a second group of antennas 730. The radio interface may for example have structures as explained in connection with FIGS. 2, 3A, and 3B. In some scenarios, the radio interface may provide multiple instances of the structures as explained in connection with FIGS. 2, 3A, and 3B, e.g., in order to support multiple spatial channels by using multiple antennas in each group of antennas 720, 730.

Further, the radio device is provided with one or more processors 740 and a memory 750. The radio interface 710, and the memory 750 are coupled to the processor(s) 740, e.g., using one or more internal bus systems of the radio device.

The memory 750 includes program code modules 760, 770 with program code to be executed by the processor(s) 740. In the illustrated example, these program code modules include an antenna switching control module 760 and a full-duplex control module 770.

The antenna switching control module 760 may implement the above-described functionalities of switching between antenna configurations. The full-duplex control module 770 may implement functionalities for controlling full-duplex radio transmissions as described above, e.g., with respect to transmission timing, transmission power, modulation and coding, or self-interference cancellation parameters.

It is to be understood that the structures as illustrated in FIG. 7 are merely exemplary and that the radio device may also include other elements which have not been illustrated, e.g., structures or program code modules for implementing known functionalities of a UE, D2D communication device, or base station of a wireless communication network.

It is to be understood that the concepts as explained above are susceptible to various modifications. For example, the concepts could be applied in connection with various kinds of radio technologies, and that the concepts may be applied with respect to various kinds of radio links, including also relay links. The switching of antenna configurations may also be used for other purposes, e.g., selecting proper combinations of antennas at the communicating radio devices, e.g., with the aim of improving channel quality or achieving matching antenna polarization. This may involve varying the groups of antennas and/or adapting the coordination between the communicating radio devices. For example, in a simple scenario the assignment of certain antennas to the above-mentioned first group of antennas and second group of antennas could be swapped at some point of time. Further, it is to be understood that the full-duplex radio transmissions may be combined with various kinds of multiplexing mechanisms, including frequency division multiplexing, time division multiplexing, code division multiplexing, and spatial multiplexing.

The invention claimed is:

1. A method of controlling full-duplex radio transmission, the method comprising:
   transmitting outgoing radio signals to a further radio device and receiving incoming radio signals from the further radio device, by a radio device, on a same carrier frequency; and
   switching, by the radio device, at least between a first antenna configuration and a second antenna configuration;
   estimating, by the radio device, first radio channel characteristics based on the incoming radio signals received in the first antenna configuration and second radio channel characteristics based on the incoming radio signals received in the second antenna configuration;
   controlling transmission in the first antenna configuration, by the radio device, of the outgoing radio signals based on the second radio channel characteristics and/or controlling reception of the incoming radio signals based on the second radio channel characteristics; and
   controlling transmission in the second antenna configuration, by the radio device, of the outgoing radio signals based on the first radio channel characteristics and/or controlling reception of the incoming radio signals based on the first radio channel characteristics,
   wherein in the first antenna configuration the outgoing radio signals are transmitted via at least one first antenna while simultaneously receiving the incoming radio signals via at least one second antenna, and
   wherein in the second antenna configuration the outgoing radio signals are transmitted via the at least one second antenna while simultaneously receiving the incoming radio signals via the at least one first antenna.

2. The method according to claim 1,
   wherein the outgoing radio signals comprise a first reference signal transmitted in the first antenna configuration and a second reference signal transmitted in the second antenna configuration.

3. The method according to claim 1,
   wherein the incoming radio signals received in the first antenna configuration comprise a first received reference signal,
   wherein the radio device estimates the first radio channel characteristics based on the first received reference signal,
   wherein the incoming radio signals received in the second antenna configuration comprise a second received reference signal, and
   wherein the radio device estimates the second radio channel characteristics based on the second received reference signal.

4. The method according to claim 1,
   wherein said controlling transmission of the outgoing radio signals and/or controlling reception of the incoming radio signals comprises controlling of a multi-antenna transmission configuration.

5. The method according to claim 1, further comprising:
   the radio device switching to a third antenna configuration,
   wherein in the third antenna configuration further outgoing radio signals are transmitted via the at least one first antenna and the at least one second antenna to the further radio device.

6. The method according to claim 1, further comprising:
   the radio device switching to a fourth antenna configuration, wherein in the fourth antenna configuration further incoming radio signals are received via the at least one first antenna and the at least one second antenna from the further radio device.

7. The method according to claim 1, further comprising:
the radio device coordinating the switching between the antenna configurations with switching of antenna configurations by the further radio device.

8. The method according to claim 1,
wherein the radio device comprises a wireless communication device.

9. The method according to claim 1,
wherein the further radio device comprises a base station of a wireless communication network.

10. A radio device, the radio device comprising:
a transmit branch configured to process outgoing radio signals transmitted on a carrier frequency to a further radio device;
a receive branch configured to process incoming radio signals received on the carrier frequency from the further radio device;
at least one first antenna and at least one second antenna;
a switch coupled between the transmit branch and the receive branch and the at least one first antenna and the at least one second antenna; and
an antenna switching controller configured to perform operations comprising:
estimating, by the radio device, first radio channel characteristics based on the incoming radio signals received in a first antenna configuration and second radio channel characteristics based on the incoming radio signals received by a second antenna configuration;
controlling transmission in the first antenna configuration, by the radio device, of the outgoing radio signals based on the second radio channel characteristics and/or controlling reception of the incoming radio signals based on the second radio channel characteristics; and
controlling transmission in the second antenna configuration, by the radio device, of the outgoing radio signals based on the first radio channel characteristics and/or controlling reception of the incoming radio signals based on the first radio channel characteristics,
wherein the switch is configured to switch at least between the first antenna configuration and the second antenna configuration,
wherein in the first antenna configuration the outgoing radio signals are transmitted via the at least one first antenna while simultaneously receiving the incoming radio signals via the at least one second antenna, and
wherein in the second antenna configuration the outgoing radio signals are transmitted via the at least one second antenna while simultaneously receiving the incoming radio signals via the at least one first antenna.

11. The radio device according to claim 10,
wherein the radio device further comprises one or more processors configured to control the switch.

12. The radio device according to claim 11,
wherein the one or more processors are configured to control the radio device to perform operations comprising:
transmitting outgoing radio signals to a further radio device and receiving incoming radio signals from the further radio device, by a radio device, on a same carrier frequency; and switching, by the radio device, at least between a first antenna configuration and a second antenna configuration;
estimating, by the radio device, first radio channel characteristics based on the incoming radio signals received in the first antenna configuration and second radio channel characteristics based on the incoming radio signals received in the second antenna configuration;
controlling transmission in the first antenna configuration, by the radio device, of the outgoing radio signals based on the second radio channel characteristics and/or controlling reception of the incoming radio signals based on the second radio channel characteristics; and
controlling transmission in the second antenna configuration, by the radio device, of the outgoing radio signals based on the first radio channel characteristics and/or controlling reception of the incoming radio signals based on the first radio channel characteristics,
wherein in the first antenna configuration, the outgoing radio signals are transmitted via at least one first antenna while simultaneously receiving the incoming radio signals via at least one second antenna, and
wherein in the second antenna configuration, the outgoing radio signals are transmitted via the at least one second antenna while simultaneously receiving the incoming radio signals via the at least one first antenna.

13. A system, comprising:
a first radio device and a second radio device configured to transmit, on a same carrier frequency, first radio signals from the first radio device to the second radio device and second radio signals from the second radio device to the first radio device;
wherein the first radio device and the second radio device are each configured to switch at least between a first antenna configuration and a second antenna configuration,
wherein the first radio device is configured to estimate first radio channel characteristics based on the second radio signals incoming from the second radio device and received in the first antenna configuration and estimate second radio channel characteristics based on the second radio signals incoming from the second radio device and received in the second antenna configuration,
wherein the first radio device is configured to control transmission in the first antenna configuration of first the radio signals that are outgoing based on the second radio channel characteristics and/or control reception of the second radio signals that are incoming based on the second radio channel characteristics; and
wherein the first radio device is configured to control transmission in the second antenna configuration of the first radio signals that are outgoing based on the first radio channel characteristics and/or control reception of the second radio signals that are incoming based on the first radio channel characteristics,
wherein in the first antenna configuration the first radio signals are transmitted from at least one first antenna of the first radio device to at least one first antenna of the second radio device while simultaneously transmitting the second radio signals are transmitted from at least one second antenna of the second radio device to at least one second antenna of the first radio device, and
wherein in the second antenna configuration the first radio signals are transmitted from the at least one second antenna of the first radio device to the at least one second antenna of the second radio device while simultaneously transmitting the second radio signals are transmitted from the at least one first antenna of the second radio device to the at least one first antenna of the first radio device.

\* \* \* \* \*

UNITED STATES PATENT AND TRADEMARK OFFICE
CERTIFICATE OF CORRECTION

PATENT NO. : 10,965,337 B2  
APPLICATION NO. : 16/338293  
DATED : March 30, 2021  
INVENTOR(S) : Erik Bengtsson Page 1 of 1

It is certified that error appears in the above-identified patent and that said Letters Patent is hereby corrected as shown below:

In the Claims

Column 16, Line 61, Claim 13:  
Please correct "signals are transmitted from" to read -- signals from --

Column 17, Lines 1-2, Claim 13:  
Please correct "signals are transmitted from" to read -- signals from --

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*